United States Patent
Harrington et al.

(10) Patent No.: US 7,046,657 B2
(45) Date of Patent: *May 16, 2006

(54) WIRELESS LOCAL AREA NETWORK SYSTEM WITH MOBILE ACCESS POINT STATION DETERMINATION

(75) Inventors: Timothy C. Harrington, Los Gatos, CA (US); Michael A. Wohl, Rogersville, TN (US)

(73) Assignee: Wherenet Corp, Santa Clara, CA (US)

( * ) Notice: Subject to any disclaimer, the term of this patent is extended or adjusted under 35 U.S.C. 154(b) by 960 days.

This patent is subject to a terminal disclaimer.

(21) Appl. No.: 10/023,481

(22) Filed: Dec. 17, 2001

(65) Prior Publication Data

US 2002/0080759 A1    Jun. 27, 2002

Related U.S. Application Data

(60) Provisional application No. 60/257,022, filed on Dec. 20, 2000.

(51) Int. Cl.
*H04J 3/06* (2006.01)

(52) U.S. Cl. ............... 370/350; 455/63
(58) Field of Classification Search ....... 370/329–350, 370/431–444, 503–520; 455/63–67.13
See application file for complete search history.

(56) References Cited

U.S. PATENT DOCUMENTS

| | | | |
|---|---|---|---|
| 5,393,965 A | 2/1995 | Bravman et al. ........... 235/383 |
| 5,418,812 A | 5/1995 | Reyes et al. .................. 375/1 |
| 5,528,621 A | 6/1996 | Heiman et al. ............. 375/200 |
| 5,536,930 A | 7/1996 | Barkan et al. .............. 235/472 |
| 5,646,389 A | 7/1997 | Bravman et al. ........... 235/385 |
| 5,768,140 A | 6/1998 | Swartz et al. .......... 364/478.13 |
| 5,768,531 A | 6/1998 | Lin ........................ 395/200.72 |
| 5,802,101 A | 9/1998 | Maruyama ................... 375/206 |
| 5,812,589 A | 9/1998 | Sealander et al. ........... 375/200 |
| 5,850,187 A | 12/1998 | Carrender et al. ...... 340/825.54 |
| 5,920,287 A * | 7/1999 | Belcher et al. ............. 342/450 |
| 5,923,702 A | 7/1999 | Brenner et al. ............. 375/202 |
| 5,995,046 A * | 11/1999 | Belcher et al. ............. 342/450 |
| 6,031,863 A | 2/2000 | Jusa et al. ................... 375/202 |
| 6,121,926 A | 9/2000 | Belcher et al. ............. 342/450 |
| 6,127,976 A | 10/2000 | Boyd et al. ................. 342/463 |
| 6,128,549 A | 10/2000 | Swartz et al. ............... 700/225 |
| 6,236,365 B1 | 5/2001 | LeBlanc et al. ............ 342/457 |
| 6,268,723 B1 | 7/2001 | Hash et al. .................. 324/243 |
| 6,711,171 B1 * | 3/2004 | Dobbins et al. ............ 370/400 |
| 6,892,054 B1 * | 5/2005 | Belcher et al. ............. 455/63.1 |

FOREIGN PATENT DOCUMENTS

| | | |
|---|---|---|
| EP | 1 050 793 A2 | 11/2000 |
| WO | 99/37047 | 7/1999 |

* cited by examiner

*Primary Examiner*—Dang Ton
*Assistant Examiner*—Phuc Tran
(74) *Attorney, Agent, or Firm*—Allen, Dyer, Doppelt, Milbrath & Gilchrist, P.A.

(57) ABSTRACT

A wireless local area network system includes a plurality of access point stations at known locations that receive and transmit communication signals within the wireless local area network. A mobile access point station receives and transmits communication signals within the wireless local area network. A location processor is operatively connected to each of the access point stations and operative to process communication signals transmitted from the mobile access point station and determining which communication signals are first-to-arrive signals based on a common timing signal and conducting differentiation of the first-to-arrive signals to locate the mobile access point station.

37 Claims, 3 Drawing Sheets

WIRELESS LOCAL AREA NETWORK SYSTEM WITH MOBILE ACCESS POINT STATION DETERMINATION

RELATED APPLICATION

This application is based upon prior filed copending provisional application Ser. No. 60/257,022 filed Dec. 20, 2000.

FIELD OF THE INVENTION

This invention relates to the field of wireless local area networks (WLAN), and more particularly, this invention relates to a wireless local area network system having a mobile access point station.

BACKGROUND OF THE INVENTION

Wireless local area networks are becoming more commonplace as the use of portable computers, such as "laptop," "notebook," and "pen" computers become increasingly common in office environments and other locations. In most conventional wireless local area networks, a number of access point base stations (or access point stations as sometimes referred) form a cellular network for communicating with wireless mobile stations or other mobile devices. Each access point station is typically connected to a network server, such as part of an ethernet or other network infrastructure. Any messages transmitted as wireless communication signals are first transmitted to an access point station instead of transmitted along wireless stations. This type of centralized wireless communication using cells provides control over communications along existing wireless mobile devices. Typically, the wireless communication signals are a spread spectrum communications signal, for example, a direct sequence spread spectrum signal, or a frequency hopping spread spectrum signal.

Although wireless local area networks are becoming more commonplace in offices and similar environments, most wireless local area networks have fixed location access point stations that are positioned at the fixed and known location and used by a plurality of mobile devices that operate with and connect to the wireless local area network system through the access point station. There are times when it may be advantageous to use a mobile access point station to extend the area of the wireless local area network or provide greater coverage in a specific area. Other reasons for using a mobile access point station are known and could be suggested to those skilled in the art.

Most prior art wireless local area networks do not provide the capability of incorporating a mobile access point station into the network because the wireless local area network has no location and processing capability to determine the location of an access point station operating in the wireless LAN environment. Although some wireless LAN systems provide for signal strength analysis of spread spectrum signals to determine location of mobile devices, none of them provide any accurate location determination system of a mobile access point station that would be operative within the wireless infrastructure defined by other access point stations.

SUMMARY OF THE INVENTION

The present invention advantageously provides a wireless local area network system that determines the location of a mobile access point station that receives and transmits communication signals within the wireless local area network and that could be operative with other mobile devices, such as location tags used in inventory control systems or other operative systems. The wireless local area network system includes a plurality of access point stations at known locations that receive and transmit communication signals within the wireless local area network. A mobile access point station receives and transmits communication signals within the wireless local area network. The location processor is operatively connected to each of the access point stations and operative to process communication signals transmitted from the mobile access point station and received in access point stations and determining which communication signals are first-to-arrive signals based on a common timing signal and conducting differentiation of the first-to-arrive signals to locate the mobile access point station.

In yet another aspect of the present invention, each access point station includes a plurality of mutually diverse antennas for detecting communication signals used in locating the mobile access point station. The location processor further comprises a matched filter correlator. This type of correlator could include matched filter banks having parallel correlators that correlate a received communication signal with time offset versions of a reference spreading code. The location processor could include a plurality of processors for distributing the processing capability.

In yet another aspect of the present invention, a wired local area network is operatively connected to an access point station to which a common timing signal is received and transmitted to other access point stations. The common timing signal could include a wireless timing signal broadcast to each of the access point stations. Also, an access point station or mobile station could be chosen and operative for generating a common timing signal.

In yet another aspect of the present invention, at least three access point stations are used for determining the location of the mobile access point station.

In another aspect of the present invention, a network management station (NMS) is operative under the Simple Network Management Protocol (SNMP. A Management Information Base (MIB) is operative with the network management station. The Management Information Base has deposited characteristics for objects corresponding to access point stations and other devices associated with the wireless local area network system for allowing management control by the network management station.

In yet another aspect of the present invention, a server receives data from the network management station and communicates management data about the wireless local area network to clients that access the server. In order to provide client access to the server via the worldwide web and internet, the server comprises an HTTP server.

A method of the present invention locates a mobile access point station used in a wireless local area network and comprises the steps of receiving and transmitting communication signals along access point stations of the wireless local area network that are located at known positions. The method further comprises the step of processing communication signals received from a mobile access point station within a location processor operatively connected to each access point station and determining which communication signals are first-to-arrive signals based on a common timing signal and conducting differentiation of the first-to-arrive signals to locate the mobile access point station.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously provides a wireless local area network system that includes a mobile access point station that is operative with a plurality of access point stations at known locations, which receive and transmit communication signals within the wireless local area network among the wireless access point stations with appropriate hand-off capability and among various mobile devices. The wireless access point stations each form a cellular structure, as known to those skilled in the art. At times, it may be desirable to add another access point station into the network, such as to increase mobile device capability or move an access point station to another location. At these times, it is necessary to "locate" the new position of the access point station in the wireless local area network.

The present invention also permits use of a mobile access point station, but also permits its position determination through the use of a location processor operatively connected to each of the access point stations and operative to process communication signals transmitted from the mobile access point stations and received in access point stations. The location processor determines which communication signals are first-to-arrive signals based on a common timing signal and conducts differentiation of the first-to-arrive signals to locate the mobile access point station. Much of the technology and detection capability as associated with the system and method of the present invention can use the circuitry and algorithms described in commonly assigned U.S. Pat. Nos. 5,920,287; 5,995,046; 6,121,926; 6,127,976; and copending utility application Ser. No. 09/997,282, filed Nov. 29, 2001, the disclosures which are all hereby incorporated by reference in their entirety.

Figure 1:
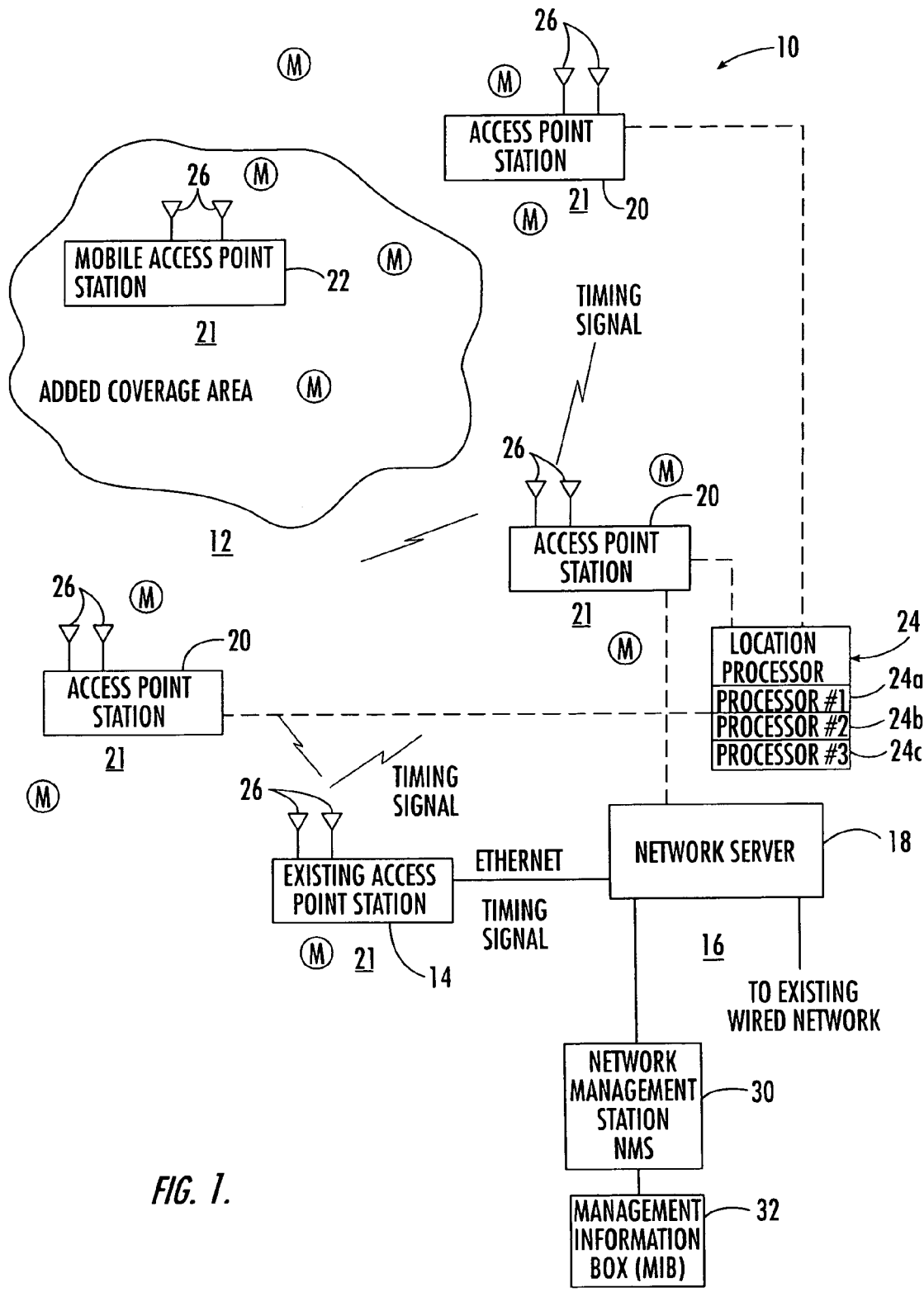
FIG. 1 is a high level block diagram of a location determination system of the present invention used for locating a mobile access point station.

FIG. 1 illustrates a high level block diagram of the system 10 of the present invention that integrates not only a wireless local area network system 12 with access point stations at known positions, but also integrates a location determination system as set forth in the above-identified and incorporated by reference patents. As illustrated, one access point station can be a standard, wireless local area network access point station 14 that is connected to a local area network 16 and a network server 18, as known to those skilled in the art. Typically, the local area network is an ethernet or other similar network. The wireless local area network could be interconnected by 10/100 ethernet or symbol S-24 wireless LAN.

A plurality of access point stations 20 with the ability to locate a mobile access point station are included and each define a cellular cell (shown as 21, indicating the general vicinity of a cell) as part of a wireless local area network. Each access point station 20 includes transmitter and receiver circuitry for communicating with mobile devices (M) and receiving and forwarding communication signals as packets to and from mobile stations and among other access point stations. Wireless mobile station techniques, in a preferred embodiment, are spread spectrum wireless communication signals. One of the access point stations is a wireless mobile access point station 22 positioned at an unknown location, as compared to other access point stations that are at known locations. The mobile access point station 22 receives and transmits communication signals within the wireless local area network 12. A location processor 24 is operatively connected to each of the access point stations 20 and operative to process communication signals transmitted from the mobile access point station 22 and received at the access point stations to determine which communication signals are first-to-arrive signals based on a common timing signal, and conducting differentiation of the first-to-arrive signals to locate the mobile access point station. The processor function could also be incorporated as distributed processing with each access point station by incorporating a processor at each access point station.

A common timing signal can be applied to each access point station and to the location processor 24 and can be provided by a wireless timing signal broadcast to each of the access point stations 20, such as by a mobile station (M) located at a known location or an access point station 20 that provides the common timing signal. In yet another aspect of the present invention, a common timing signal can be supplied through a wired ethernet bus to a network server 18 into an access point station and wirelessly transmitted to other access point stations.

Each access point station could include a plurality of mutually diverse antennas 26 used in locating the mobile access point station. The determination of the location for the mobile access point station can use a communications signal, which could include a separate location packet or pulse. It could occur by processing part of the normal data or by processing packets that are used specifically for locating the mobile access point station. A communication signal transmitted from the mobile access point station 22 could include a spread spectrum location pulse appended to the wireless communication signal that could be of short duration (typically less than one millisecond) spread spectrum transmission as a location pulse, which is distinct and different from the wireless local area network communication signal. The location pulse could be appended to the falling edge of the wireless communication signal or appended to the beginning or rising edge of the communication signal.

The mobile devices or stations in communication with a mobile access point station could transmit location data as appended pulses as set forth in the incorporated by reference copending application Ser. No. 09/997,282, filed Nov. 29, 2001. The mobile access point station could also add any signaling and location information as determined by those skilled in the art. Although direct sequence spread spectrum communication signals are preferred, including any location pulse, frequency hopping, chirp or other spread spectrum signal techniques can also be used. Location transmitters and location receives with appropriate communications circuitry, as set forth in the incorporated by reference patents and copending patent application, can be included as part of any mobile station or access point station as determined by those skilled in the art.

As shown in FIG. 1, a Network Management Station (NMS) 30 is operative under the Simple Network Management Protocol (SNMP) and is operative with a Management Information Base (MIB) 32. Deposited characteristics for objects corresponding to access point stations and other devices associated with the wireless local area network system allow management control by the network management station 30. The wired local area network could also be incorporated with an enterprise network and the network management station could be operative to manage the network from a central location and collect network statistics for capacity planning. It is also possible to work with agents that monitor devices as the objects and report information to the network management station 30. Any devices that are not SNMP-compliant could be linked to the network management station by a proxy agent. The network management station 30 can provide information display, communicate with agents, perform information filtering and control capabilities. The management information base 32 contains a description of SNMP-compliant objects on the network and the kids of management information they provide.

For purposes of description, the type of location circuits, algorithms, and associated functions that can be used with the present invention, such as the location processor functions and any location receivers and location transmitters, are set forth in the incorporated by reference patents. For purposes of description, FIGS. 2 and 3 describe representative examples of circuit architectures that can be used for representative access point station and location processor.

Figure 2:
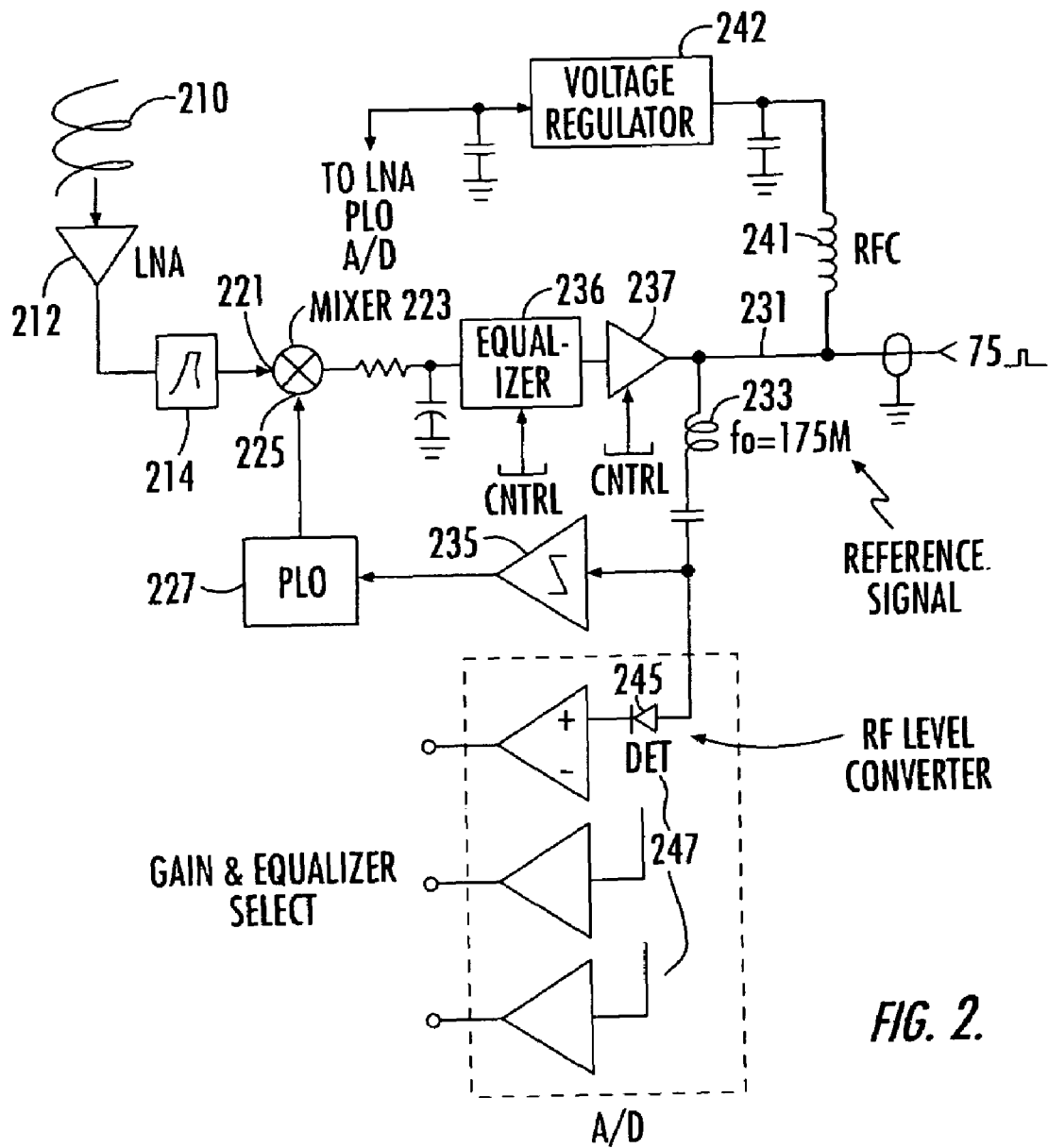
FIG. 2 is a high level block diagram of one example of the circuit architecture that can be used with the present invention on the receive side.

FIG. 2 diagrammatically illustrates one type of circuitry configuration of a respective architecture for "reading" associated communication signals or a pulse (a "blink") used for location determination signals, such as signals emitted from a mobile station (M) or generally the mobile access point station that is to be located in the present invention. An antenna 210 senses appended transmission bursts or other signals from the mobile access point station to be located. The antenna in this aspect of the invention could also be omnidirectional and circularly polarized and coupled to a power amplifier 212, whose output is filtered by a bandpass filter 214. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and applied to communication cable 231 to a communication signal processor, which could be associated processor 32, 32a. The communication cable 231 also supplies DC power for the various components of the location receiver by way of an RF choke 241 to a voltage regulator 242, which supplies the requisite DC voltage for powering an oscillator, power amplifier and analog-to-digital units of the receiver.

The amplitude of the (175 MHZ) reference frequency supplied by the communications control processor to the phase locked local oscillator 227 implies the length of any communication cable 231 (if used) between the location processor and a receiver, such as if part of an access point station. This magnitude information can be used as control inputs to equalizer 236 and current amplifier 237, so as to set gain and/or a desired value of equalization, that may be required to accommodate any length of a communication cable (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

Figure 3:
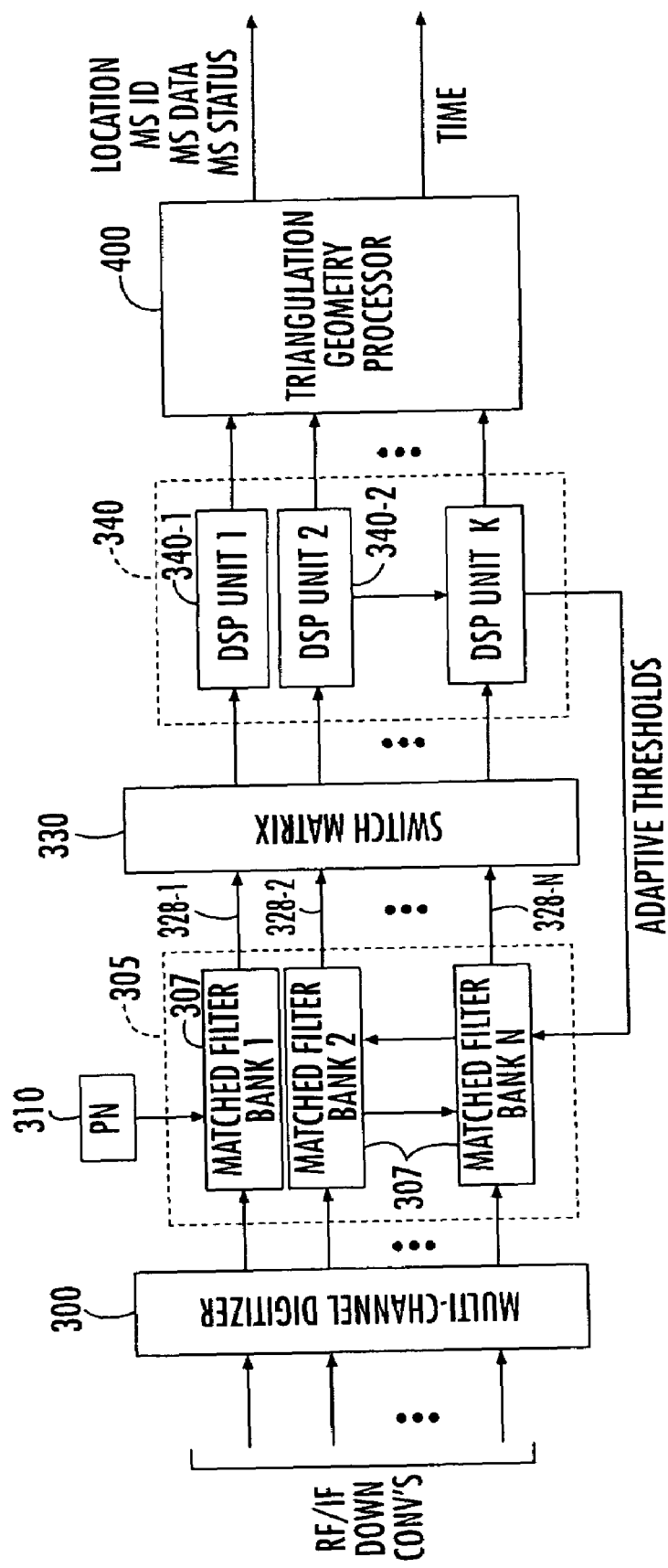
FIG. 3 is another high level block diagram of one example of the circuit architecture that can be used for correlation-based RF signal processors in accordance with the present invention.

FIG. 3 diagrammatically illustrates the architecture of a correlation-based, RF signal processor as part of a processor to which the output of a respective RF/IF conversion circuit of FIG. 2 can be coupled for processing the output and determining location. The correlation-based RF signal processor correlates spread spectrum signals detected by its associated receiver with successively delayed or offset in time (by a fraction of a chip) spread spectrum reference signal patterns, and determines which spread spectrum signal received by a receiver of an access point station is the first-to-arrive corresponding to a location pulse or communications signal from the transmitter of a mobile access point station as part of the communications signal that has traveled over the closest observable path between the mobile access point station and the fixed location access point station.

Because each receiver can be expected to receive multiple signals from the mobile access point station 22, due to multipath effects caused by the signal transmitted by the mobile access point station being reflected off various objects/surfaces between the mobile access point station and the receiver of other known access point stations 20, the correlation scheme ensures identification of the first observable transmission, which is the only signal containing valid timing information from which a true determination can be made of the distance from the station to the receiver.

For this purpose, as shown in FIG. 3, the RF processor employs a front end, multi-channel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive ADCs that are capable of directly sampling very high IF frequencies and large bandwidths. Implementing a bandpass filtering approach typically requires a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by the PN spreading sequence generator of the location transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . , 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-i of the set of digital signal processing units 340. The mobile access point station can "blink" or transmit location pulses randomly, and can be statistically quantified, and thus, the number of potential simultaneous signals over a processor revisit time could determine the number of such "on-demand" digital signal processors required. A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 uses a standard multi-lateration algorithm that relies upon time-of-arrival inputs from at least three detectors of the access point stations 20 to compute the location of the mobile access point station 22. The algorithm may be one which uses a weighted average of the received signals. In addition to using the first observable signals to determine object location, the processor also can read any data read out of a memory for the mobile access point station (or mobile device if applicable) and superimposed on the transmission. Object position and parameter data can be downloaded to a data base where object information is maintained. Any data stored in a mobile station memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multipath effects, by using dual antenna (as shown generally with dual antenna in FIG. 1) and providing spatial diversity-based mitigation of multipath signals. In such systems, the antennas of each location receiver at an access point station are spaced apart from one another by a distance that is sufficient to minimize destructive multipath interference at both antennas simultaneously, and also ensure that the antennas are close enough to one another so as to not significantly affect the calculation of the location of the object by the downstream multi-lateration processor.

The multi-lateration algorithm executed by the location processor 24 is modified to include a front end subroutine that selects the earlier-to-arrive outputs of each of the detector pairs as the value to be employed in the multi-lateration algorithm. A plurality of auxiliary "phased array" signal processing paths can be coupled to the antenna set (e.g., pair), in addition to the paths containing the directly connected receivers and their associated first arrival detectors that feed the triangulation locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference U.S. Pat. No. 6,127,976 and generally shown by the block diagram in FIG. 1, where multiple processing units 24a, 24b, 24c are shown. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of detection processors. The partitioned detection processors are coupled in turn through distributed association processors to multiple location processors. For mobile access point station (or mobile device) detection capability, each receiver could also be equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a mobile device. The detection processor demodulates and time stamps all received energy that is correlated to known spreading codes of the transmission, so as to associate a received location pulse with only one mobile. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

The flow control mechanism uses an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for an individual mobile access point station (or mobile device) to a single destination location processor, the association communication process of the communication framework may employ the same information and processing load distribution algorithm executed by the detection communication process of the communication framework. Each location processor determines the geographical location of a mobile access point station (or mobile device) using the time-of-arrival measurement information originally sourced from the detection processors. The specific algorithm employed for location determination matches the number of arrival time measurements with whatever a priori information is available.

To locate a mobile access point station (or mobile device), a location processor may employ all available diversity information associated with the mobile of interest, including, but not limited to the station ID (if any), any data contained in the transmission and metrics indicating confidence it these values. It then forwards a location report containing this information over a location communication process to an asset management data base. A location estimate may be derived from the measured time-of-arrival information in a received association report packet, using a differential time-of-arrival algorithm, such as a hyperbolic geometry-based function.

It is also possible to use a wireless local area network (WLAN) spread spectrum waveform to perform the geo-location function of the present invention. The assumption is that the wireless communication signal, as a spread spectrum signal, has a high signal-to-noise ratio with reasonable power levels. The leading edge of this communication signal can be detected to a high accuracy and this information used with the algorithms as described before to provide relative time of arrival information for subsequent processing. It is possible to use edge detector circuitry 60 as part of an access point station 20 having a wireless local area network (WLAN) receiver. It is also possible to have a timing signal from a known location or unknown location. Other component locations could be known, of course. For example, some wireless local area network (WLAN) transmitters have known locations to enable the use of the algorithm when an access point station or mobile station location is known.

It is also known that the communications signal as a spread spectrum communications signal can have sufficient bandwidth to provide useful time accuracy. For example, a 50 MHz bandwidth could provide approximately 5 nanoseconds of timing accuracy that is about 5 feet of accuracy using much of the technology and teachings described before. It is possible to use a correlator operative as a functional spread spectrum matched filter to enable a higher quality estimate with integration over many chips of the spread spectrum transmission. It is possible to use a matched filter that spans multiple symbols and improve accuracy by collecting more energy in the filter prior to leading edge detection.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A wireless local area network system comprising:
   a plurality of access point stations at known locations that receive and transmit communication signals within the wireless local area network;
   a mobile access point station that receives and transmits communication signals within the wireless local area network; and
   a location processor operatively connected to each of the access point stations and operative to process communication signals transmitted from the mobile access point base station and received in access point stations and determining which communication signals are first-to-arrive signals based on a common timing signal and conducting differentiation of the first-to-arrive signals to locate the mobile access point station.

2. A system according to claim 1, wherein each access point station includes a plurality of mutually diverse antennas for detecting communication signals used in locating the mobile access point station.

3. A system according to claim 1, wherein said location processor further comprises a matched filter correlator.

4. A system according to claim 3, wherein said matched filter correlator further comprises matched filter banks having parallel correlators that correlate a received communications signal with time offset versions of a reference spreading code.

5. A system according to claim 1, wherein said location processor further comprises a plurality of processors for distributing processing capability.

6. A system according to claim 1, and further comprising a wired local area network operatively connected to an access point station through which a common timing signal is received and transmitted to other access point stations.

7. A system according to claim 1, wherein the common timing signal comprises a wireless timing signal broadcast to each of said access point stations.

8. A system according to claim 1, wherein an access point station is operative for generating the common timing signal.

9. A system according to claim 1, wherein at least three access point stations are used for determining the location of the mobile access point station.

10. A wireless local area network system comprising:
a plurality of access point stations at known locations that receive and transmit communication signals within the wireless local area network;
a mobile access point station that receives and transmits communication signals within the wireless local area network;
a location processor operatively connected to each of the access point stations and operative to process communication signals transmitted from the mobile access point station and received in access point stations and determining which communication signals are first-to-arrive signals based on a common timing signal and conducting differentiation of the first-to-arrive signals to locate the mobile access point station; and
a network management station (NMS) operative under the Simple Network Management Protocol (SMNP) and a management information base (MIB) operative with the network management station and having deposited characteristics for objects corresponding to access point stations and other devices associated the wireless local area network system for allowing management control by the network management station.

11. A system according to claim 10, and further comprising a server for receiving data from the network management station and communicating management data about the wireless local area network to clients that access the server.

12. A system according to claim 11, wherein said server comprises an HTTP server for accessing management data via the internet.

13. A system according to claim 10, wherein each access point station includes a plurality of mutually diverse antennas for detecting communication signals used in locating the mobile access point station.

14. A system according to claim 10, wherein said location processor further comprises a matched filter correlator.

15. A system according to claim 14, wherein said matched filter correlator further comprises matched filter banks having parallel correlators that correlate a received communications signal with time offset versions of a reference spreading code.

16. A system according to claim 10, wherein said location processor further comprises a plurality of processors for distributing processing capability.

17. A system according to claim 10, and further comprising a wired local area network operatively connected to an access point station through which a common timing signal is received and transmitted to other access point stations.

18. A system according to claim 10, wherein said common timing signal comprises a wireless timing signal broadcast to each of said access point stations.

19. A system according to claim 10, wherein an access point station is operative for generating the common timing signal.

20. A method of locating a mobile access point station used in a wireless local area network comprising the steps of:
receiving and transmitting communication signals among access point stations of the wireless local area network that are located at known positions; and
processing communication signals received from a mobile access point station within a location processor operatively connected to each access point station and determining which communication signals are first-to-arrive signals based on a common timing signal and conducting differentiation of the first-to-arrive signals to locate the mobile access point station.

21. A method according to claim 20, and further comprising the step of receiving the communication signals at each access point station within mutually diverse antennas.

22. A method according to claim 20, and further comprising the step of processing the communication signals within a matched filter processor of the location processor.

23. A method according to claim 22, and further comprising the step of processing within matched filter banks having parallel correlators and correlating a received communication signal with time offset versions of a reference spreading code.

24. A method according to claim 23, and further comprising the step of distributing processing capability among a plurality of processors.

25. A method according to claim 20, and further comprising the step of receiving a timing signal into an access point station through a wired local area network that is operatively connected to the access point station.

26. A method according to claim 20, and further comprising the step of broadcasting a wireless timing signal to each of the access point stations.

27. A method according to claim 20, and further comprising the step of generating a common timing signal within an access point station and wirelessly transmitting the common timing signal to any other access point stations within the wireless local area network.

28. A method of locating a mobile access point station used in a wireless local area network comprising the steps of:
receiving and transmitting communication signals among access point stations of the wireless local area network that are located at known positions;
processing communication signals received from a mobile access point station within a location processor operatively connected to each access point station and determining which communication signals are first-to-arrive signals based on a common timing signal and conducting differentiation of the first-to-arrive signals to locate the mobile access point station; and
managing the wireless local area network using a network management station (NMS) operative under the Simple Network Management Protocol (SMNP) and a management information base (MIB) operative with the network management station and having deposited characteristics for objects corresponding to access point stations and other devices associated with the wireless local area network system.

29. A method according to claim 28, and further comprising the step of transmitting data from a server that has received data from the network management station to a client accessing the server.

30. A method according to claim 29, wherein the server comprises a HTTP server for communicating over the internet.

31. A method according to claim 28, and further comprising the step of receiving the communication signals at each access point station within mutually diverse antennas.

32. A method according to claim 28, and further comprising the step of processing the communication signals within a matched filter processor of the location processor.

33. A method according to claim 32, and further comprising the step of processing within matched filter banks having parallel correlators and correlating a received communication signal with time offset versions of a reference spreading code.

34. A method according to claim 28, and further comprising the step of distributing processing capability among a plurality of processors.

35. A method according to claim 28, and further comprising the step of receiving a timing signal into an access point station through a wired local area network that is operatively connected to the access point station for transmission to other access point stations.

36. A method according to claim 28, and further comprising the step of broadcasting a wireless timing signal to the access point stations.

37. A method according to claim 28, and further comprising the step of generating a common timing signal within an access point station and wirelessly transmitting the common timing signal to other access point stations within the wireless local area network.

* * * * *